United States Patent
Hanley et al.

(10) Patent No.: US 8,881,398 B2
(45) Date of Patent: Nov. 11, 2014

(54) METHOD AND APPARATUS FOR INSULATING A REFRIGERATION APPLIANCE

(75) Inventors: Kenneth Joseph Hanley, Louisville, KY (US); Martin Christopher Severance, Louisville, KY (US)

(73) Assignee: General Electric Company, Schenectady, NY (US)

(*) Notice: Subject to any disclaimer, the term of this patent is extended or adjusted under 35 U.S.C. 154(b) by 750 days.

(21) Appl. No.: 13/116,352

(22) Filed: May 26, 2011

(65) Prior Publication Data

US 2012/0297813 A1    Nov. 29, 2012

(51) Int. Cl.
| | | |
|---|---|---|
| *F25D 11/00* | (2006.01) | |
| *B29C 44/12* | (2006.01) | |
| *F25D 23/06* | (2006.01) | |
| *B29C 44/06* | (2006.01) | |
| *B29L 31/00* | (2006.01) | |

(52) U.S. Cl.
CPC .......... *F25D 23/064* (2013.01); *B29C 44/1228* (2013.01); *F25D 2201/14* (2013.01); *B29L 2031/7622* (2013.01); *B29C 44/065* (2013.01)
USPC ..................... 29/890.035; 29/897.32; 29/469; 62/440; 312/406

(58) Field of Classification Search
CPC ............ F25D 2201/10; F25D 2201/12; F25D 2201/122; F25D 2201/124; F25D 2201/126; F25D 2201/1262; F25D 2201/1282; F25D 2201/14; F25D 11/003; F25D 23/061; F25D 23/062; F25D 23/063; F25D 23/064; F25D 23/065; F25D 23/066; F25D 23/067; F25D 23/068; F25D 23/069

USPC ........ 29/890.035, 897.32, 469; 312/406, 401; 62/77, 440
See application file for complete search history.

(56) References Cited

U.S. PATENT DOCUMENTS

| | | | | |
|---|---|---|---|---|
| 3,601,463 A | * | 8/1971 | Watt ............................. | 312/406 |
| 3,910,658 A | * | 10/1975 | Lindenschmidt ............ | 312/406 |
| 3,913,996 A | * | 10/1975 | Benford ....................... | 312/406 |
| 3,933,398 A | * | 1/1976 | Haag ............................ | 312/406 |
| 3,989,329 A | * | 11/1976 | Benford ....................... | 312/406 |
| 4,006,947 A | * | 2/1977 | Haag et al. ................... | 312/406 |
| 4,026,004 A | * | 5/1977 | Fields et al. ................. | 29/458 |
| 4,043,624 A | * | 8/1977 | Lindenschmidt ............ | 312/406 |
| 5,066,437 A | * | 11/1991 | Barito et al. ................. | 264/46.5 |
| 5,082,335 A | | 1/1992 | Cur et al. | |
| 5,252,408 A | | 10/1993 | Bridges et al. | |
| 5,500,305 A | | 3/1996 | Bridges et al. | |
| 5,512,345 A | * | 4/1996 | Tsutsumi et al. ............. | 428/69 |
| 5,632,543 A | * | 5/1997 | McGrath et al. ............. | 312/406 |
| 5,664,396 A | | 9/1997 | Lyman et al. | |
| 5,669,232 A | * | 9/1997 | Iwamoto et al. ............. | 62/296 |

(Continued)

*Primary Examiner* — David Bryant
*Assistant Examiner* — Jason L Vaughan
(74) *Attorney, Agent, or Firm* — Global Patent Operation; Marc A. Vivenzio

(57) ABSTRACT

A method of insulating a refrigeration appliance. The refrigeration appliance includes a case, a liner, and a five-sided, box like vacuum panel. The liner is formed to be inserted into the case forming a chamber between the liner and the case. The five sides of the vacuum panel define a cavity. The method includes in one embodiment, positioning the five-sided vacuum panel in the chamber between the case and the liner, injecting foam into the chamber, and curing the foam to attach the five sided vacuum panel to the case and the liner.

9 Claims, 4 Drawing Sheets

(56) References Cited

U.S. PATENT DOCUMENTS

| | | | |
|---|---|---|---|
| 5,897,932 A | 4/1999 | McGarth et al. | |
| 5,977,197 A | 11/1999 | Malone | |
| 6,109,712 A | 8/2000 | Haworth et al. | |
| 6,128,914 A * | 10/2000 | Tamaoki et al. | 62/440 |
| 6,192,703 B1 | 2/2001 | Salyer et al. | |
| 6,244,458 B1 | 6/2001 | Frysinger et al. | |
| 6,260,377 B1 | 7/2001 | Tamaoki et al. | |
| 6,305,768 B1 * | 10/2001 | Nishimoto | 312/406 |
| 6,322,869 B1 | 11/2001 | Dietrich | |
| 6,381,981 B1 | 5/2002 | Yaddgo et al. | |
| 6,464,313 B2 * | 10/2002 | Nishimoto | 312/406 |
| 6,860,082 B1 | 3/2005 | Yamamoto et al. | |
| 7,182,417 B2 * | 2/2007 | Taylor et al. | 312/406.2 |
| 7,210,308 B2 * | 5/2007 | Tanimoto et al. | 62/440 |
| 7,278,279 B2 * | 10/2007 | Hirai et al. | 62/440 |
| 7,316,125 B2 * | 1/2008 | Uekado et al. | 62/440 |
| 2002/0018872 A1 | 2/2002 | Ehrmanntraut | |
| 2003/0082357 A1 | 5/2003 | Gokay et al. | |
| 2004/0074208 A1 | 4/2004 | Olson et al. | |
| 2007/0100009 A1 | 5/2007 | Creazzo et al. | |
| 2008/0035636 A1 | 2/2008 | Grant et al. | |
| 2009/0032541 A1 | 2/2009 | Rogala et al. | |
| 2009/0179541 A1 | 7/2009 | Smith et al. | |

* cited by examiner

METHOD AND APPARATUS FOR INSULATING A REFRIGERATION APPLIANCE

BACKGROUND OF THE INVENTION

1. Field of the Invention

The field of the invention relates generally to thermally insulated refrigeration appliance structures, and more particularly to refrigeration appliance structures having a five-sided, box-like vacuum panel.

2. Description of Related Art

It is usual to insulate some appliances from the surrounding environment. For example, in a refrigerator, freezer, oven/range or dishwasher, an internal compartment of the appliance is typically insulated to minimize thermal heat transfer between the compartment and the surrounding environment. The particular type of insulation utilized can actually vary. In refrigerators, for example, it is known to inject a foam insulation into a cavity formed between an outer case of the refrigerator and a liner that defines one or more internal food storage compartments. Once the foamed insulation cures, a solid insulation barrier is provided which not only thermally insulates each internal compartment but also adds structural integrity to the overall cabinet assembly.

Another type of thermal insulation that has been used in appliances and other cabinet structures are insulation panels. In general, such panels are pre-formed into desired shapes and, in the case of a refrigerator, positioned between inner walls of the outer case and the liner. Typically, each panel is defined by first and second liner sheets which are sealed together about their edges and between which is arranged a low thermal conductive insulation material, for example, fiberglass. To increase thermal insulation properties, the interiors of such panels can be evacuated prior to insertion of the panels into the case. The case and the vacuum panels are constructed separately and then assembled to form the overall appliance structure.

The use of vacuum panels can enhance the thermal insulation properties of cabinet structures over foam insulation. However, known vacuum panels typically do not extend into the corners of the cabinet which create areas that cause temperature gradients and heat leaking through the insulation chamber of the appliance.

BRIEF SUMMARY OF THE INVENTION

In one aspect, a method of insulating a refrigeration appliance is provided. The refrigeration appliance includes a case, a liner, and a five-sided, box like vacuum panel. The liner is formed to be inserted into the case forming a chamber between the liner and the case. The five sides of the vacuum panel define a cavity. The method includes positioning the five-sided vacuum panel in the chamber between the case and the liner, injecting foam into the chamber, and curing the foam to attach the five sided vacuum panel to the case and the liner.

In another aspect, a method of insulating a refrigeration appliance is provided. The refrigeration appliance includes a case, a liner, and a five-sided, box like vacuum panel. The liner is formed to be inserted into the case forming a chamber between the liner and the case. The five sides of the vacuum panel define a cavity. The method includes positioning the five-sided vacuum panel in the case, injecting foam between an outer surface of the five-sided vacuum panel and an inner surface of the case, and curing the foam to attach the five sided vacuum panel to the case. The method also includes, inserting the liner into the cavity of the five-sided vacuum panel, injecting foam between an inner surface of the five-sided vacuum panel and an outer surface of the liner, and curing the foam to attach the five-sided vacuum panel to the liner.

In another aspect, a method of insulating a refrigeration appliance is provided. The refrigeration appliance includes a case, a liner, and a five-sided, box like vacuum panel. The liner is formed to be inserted into the case forming a chamber between the liner and the case. The five sides of the vacuum panel define a cavity. The method includes positioning the five-sided vacuum panel over the outer surface of the liner, injecting foam between an inner surface of the five-sided vacuum panel and an outer surface of the liner, and curing the foam to attach the five-sided vacuum panel to the liner. The method also includes positioning the case over the five-sided vacuum panel, injecting foam between an outer surface of the five-sided vacuum panel and an inner surface of the case, and curing the foam to attach the five-sided vacuum panel to the case.

In another aspect, a vacuum panel is provided. The vacuum panel includes a barrier envelope an insulative core material positioned inside the barrier envelope, and four side portions and a back portion defining a cavity. The four side portions and the back portion are formed by the barrier envelope and the insulative core material.

In another aspect, an appliance is provided. The appliance includes a case, and, a five-sided, box like vacuum panel positioned in the case. The five-sided vacuum panel having a cavity defined by the five sides of said vacuum panel. The appliance also includes a liner positioned in said cavity of said five-sided vacuum panel, a first layer of insulative foam between a first surface of said five-sided vacuum panel and said case, and a second layer of insulative foam between a second, opposite surface of said five-sided vacuum panel and said liner.

DETAILED DESCRIPTION OF THE INVENTION

A method of insulating a refrigeration appliance using a five-sided vacuum panel and a dual foaming process is described below in detail. The dual foaming process includes, in one embodiment, injecting foam between the five-sided vacuum panel and the case of the appliance, curing the foam, and then injecting foam between the five-sided vacuum panel and the liner of the appliance. In another embodiment, the foam injection sequence is reversed. The five-sided vacuum panel extends into the corners of the cabinet and prevents heat leaks at the corners of the appliance. The five-sided vacuum panel may be utilized in the cabinet of a refrigeration appliance and also in the door of a refrigeration appliance. In addition, it should be understood that a refrigeration appliance apparatus may be a refrigerator, a freezer, and a combination refrigerator-freezer appliance.

Figure 1:
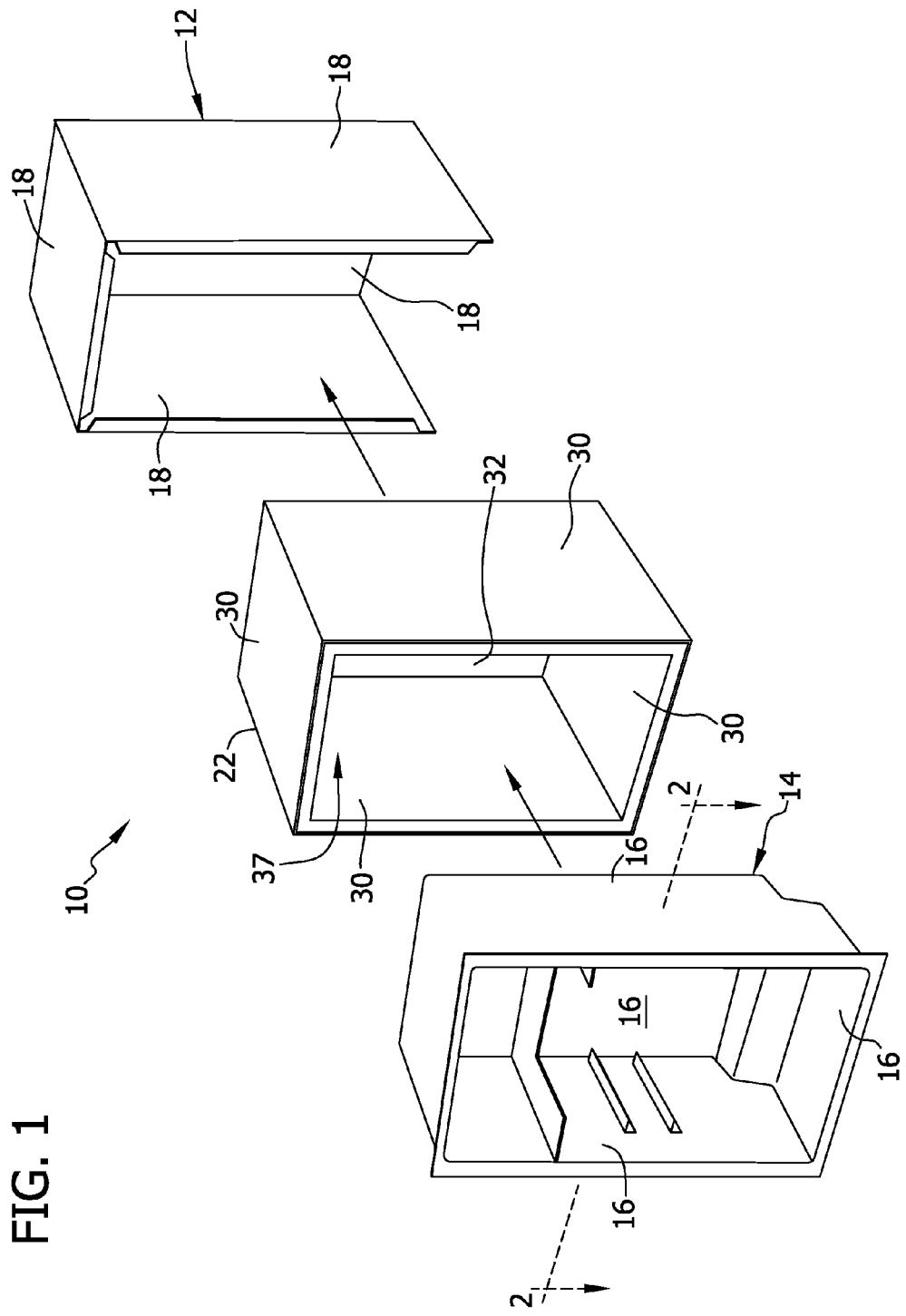
FIG. 1 is an exploded view of a refrigeration appliance cabinet in accordance with an exemplary embodiment.
Figure 2:
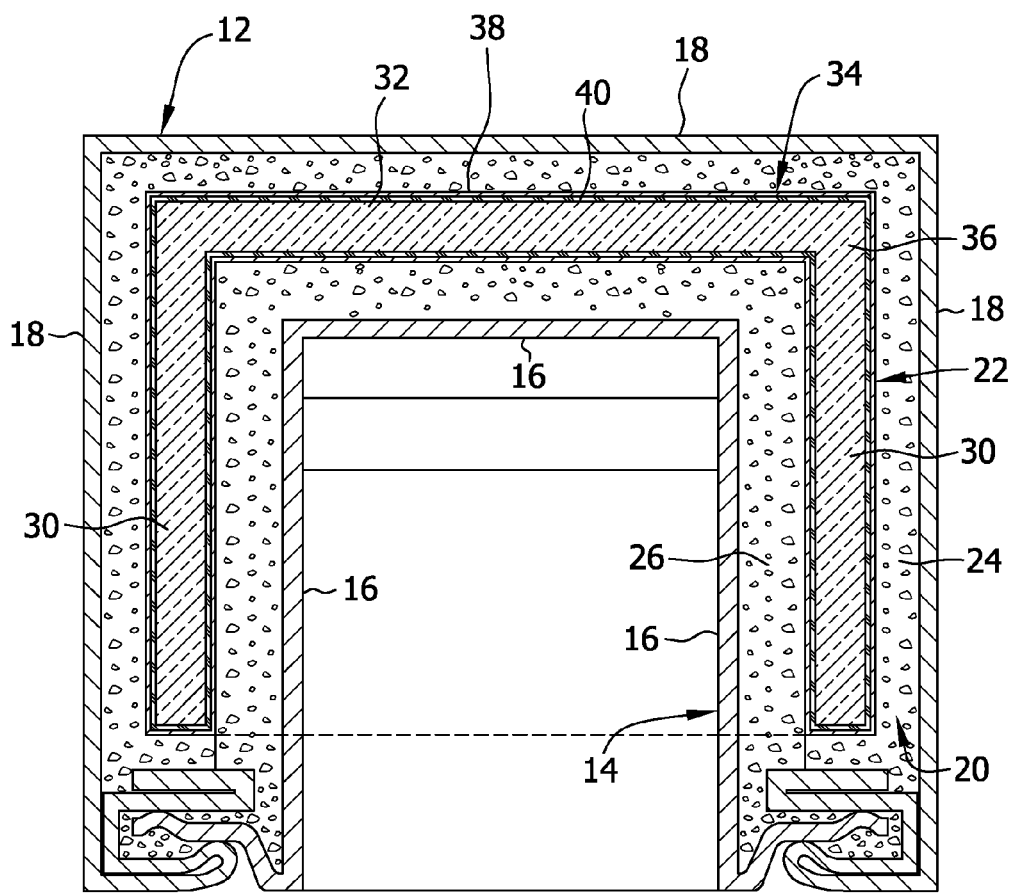
FIG. 2 is a cross sectional view through line 2-2 in FIG. 1.

Referring to the drawings, FIG. 1 is an exploded view of a refrigeration appliance cabinet 10, and FIG. 2 is a cross sectional view through line 2-2. Refrigeration appliance cabinet 10, in an exemplary embodiment, includes a case 12 and a liner 14 that is inserted into case 12. Liner 14 is sized so that when inserted into case 12 sides 16 of liner 14 and sides 18 of case 12 are spaced apart forming a chamber 20. A five-sided vacuum panel 22 is positioned in chamber 20. A layer 24 of foam is injected between the five-sided vacuum panel 22 and case 12 to attach five-sided vacuum panel 22 to case 12. In addition, a layer 26 of foam is injected between the five sided panel 22 and liner 14 to attach five-sided vacuum panel 22 to liner 14. Foam layers 24 and 26 provide structural integrity to cabinet 10, and provide insulation in combination with five-sided vacuum panel 22. Suitable foams used to make foam layers 24 and 26 may include, but are not limited to, polyurethane foams and polystyrene foams.

Five-sided vacuum panel 22 has four side portions 30 and a back portion 32 that forms a box-like structure. Five-sided vacuum panel 22 includes a barrier envelope 34 and an insulative core material 36 positioned inside barrier envelope 34. Insulative core material 36 and barrier envelope 34 forms side portions and back portion 32 of five sided vacuum panel 22. The four side portions 30 and back portion 32 defines a cavity 37 in vacuum panel 22.

Barrier envelope 34 is made of a material that is substantially impermeable to atmospheric gases, for example, nitrogen and oxygen. Suitable materials that may be used include, but are not limited to, metalized plastic films, thermoplastic films, and plastic laminates. For example, the metalized plastic may be a metalized polyethylene terephthalate (PET), a metalized polypropylene, a metalized polystyrene, and the like. The thermoplastic film may be a bi-axially oriented polypropylene film, a polystyrene film, a PET film, and the like. In addition, the plastic laminates may include at least one metal layer 38 and at least one plastic layer 40, where metal layers 38 and plastic layers 40 alternate. Metal layers 38 may be a ferrous material and a non-ferrous material. In one embodiment, metal oxide layers may be used for one or more of metal layers 38 to reduce thermal bridging on the outside of the vacuum panel 22 by reducing the thermal conductivity of barrier envelope 34.

In one embodiment, barrier envelope 34 has a thickness of not greater than about 200 µm, and in another embodiment not greater than about 120 µm. The thickness of barrier envelope 34 may have an influence of thermal bridging of vacuum panel 22. A lower thickness may reduce thermal bridging, and enhance the performance of vacuum insulation panel 22. However, a sufficient thickness of barrier envelope 34 facilitates maintaining structural integrity and maintaining a reduced pressure within barrier envelope 34. In one embodiment, barrier envelope 34 is at least about 60 µm in thickness, and in another embodiment, at least about 70 µm.

Insulative core material 36 may be any material that has a relatively low thermal conductivity. Suitable materials include, but are not limited to, thermally insulative fibers, insulative powder, and open celled foams, for example, polyurethane and polystyrene foams. In one embodiment, the insulative core material 36 includes pores having an average pore size of not greater than about 100 nm, and in another embodiment, the pores of the insulative core material 36 are at least smaller than the mean free path of air or another gas contained within barrier envelope 34. Insulative core material 36 is lightweight and has a bulk density in one embodiment, of not greater than about 0.50 g/cm$^3$ and in another embodiment, not greater than about 0.25 g/cm$^3$.

Suitable insulative powders may include, but are not limited to, metal oxides, for example, silica ($SiO_2$), aluminosilicates, siliceous minerals, perlite, alumina ($Al_2O_3$), and fumed alumina. Also, insulative powders may be a nanoporous metal oxide, for example, silica in the form of fumed silica and silica aerogel. Suitable insulative fibrous material that may be used in vacuum panel 22 include, but are not limited to, carbon fibers, glass fibers, metal fibers, polyethylene fibers, polyester fibers, and other known polymer fibers. The air in vacuum panel 22 is evacuated to reduce the pressure within vacuum panel 22 to below atmospheric pressure. In one embodiment the pressure in vacuum panel 22 is reduced to about 100 millibars or less, and in another embodiment, the pressure in vacuum panel 22 is reduced to about 10 millibars or less.

Figure 3:
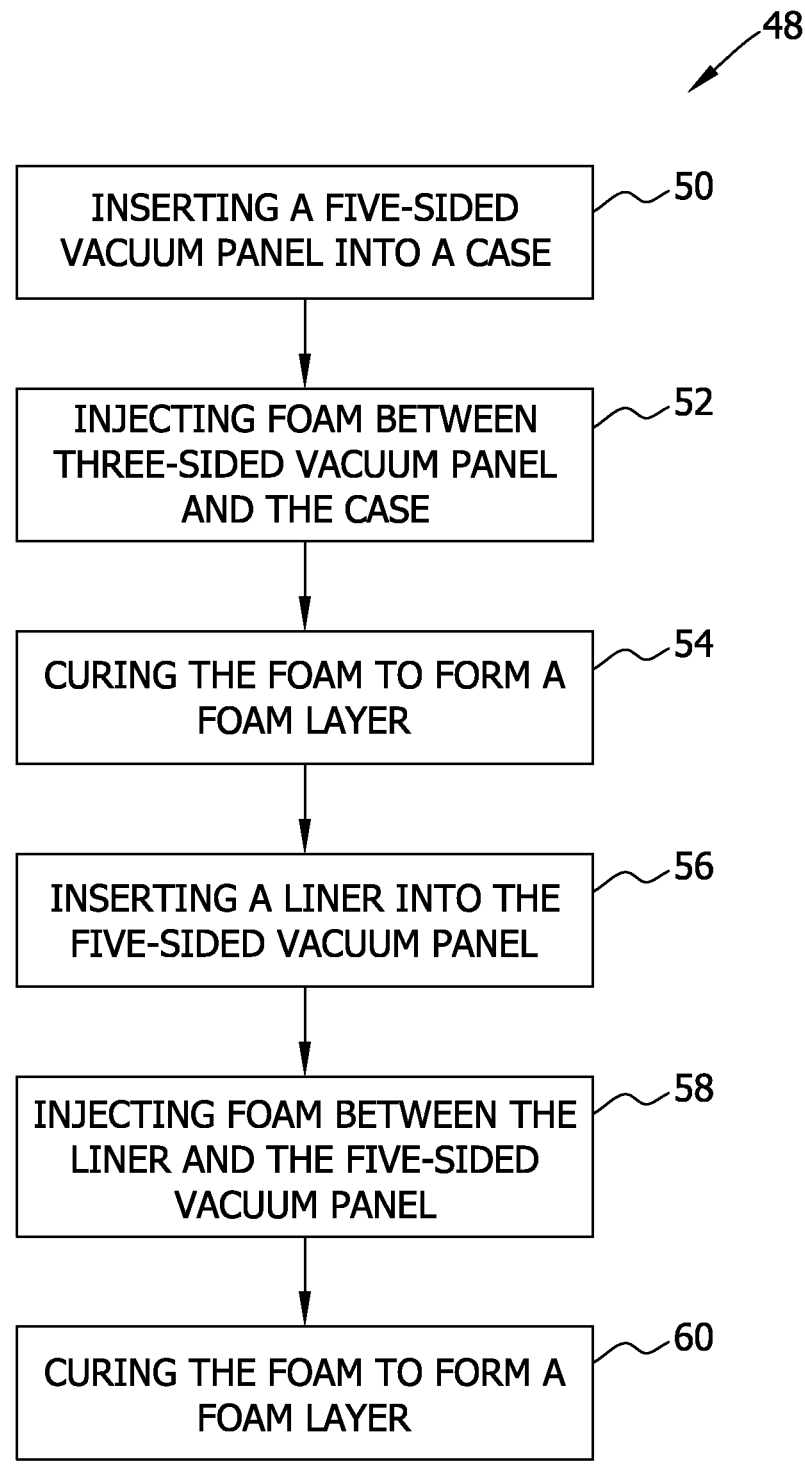
FIG. 3. is flow chart of a method of making a refrigeration appliance in accordance with an exemplary embodiment.
Figure 4:
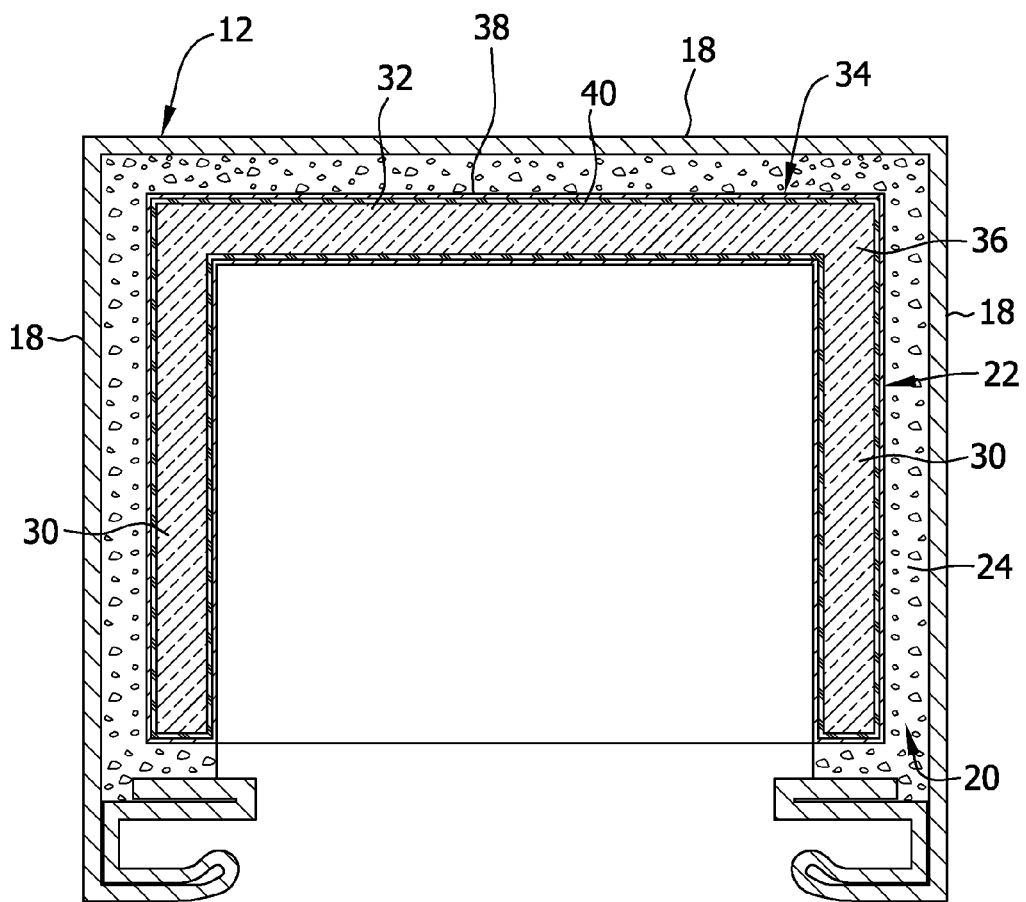
FIG. 4 is a cross sectional view through line 2-2 in FIG. 1 partially assembled.

Referring also to FIG. 3, refrigeration appliance cabinet 10 is insulated utilizing five-sided vacuum panel 22 and a dual foaming process. Particularly, a method 48 of insulating refrigeration appliance cabinet 10 includes the steps of inserting 50 five-sided vacuum panel 22 into case 12, then injecting 52 foam between five-sided vacuum panel 22 and case 12, and curing 54 the foam to form foam layer 24 and to attach five-sided vacuum panel 22 to case 12 as shown in FIG. 4. Method 48 also includes the steps of inserting 56 liner 14 into cavity 37 of five-sided vacuum panel 22, then injecting 58 foam between liner 14 and five-sided vacuum panel 22, and curing 60 the foam to form foam layer 26 and to attach five-sided vacuum panel 22 to liner 14 as shown in FIG. 2.

The foam is injected between case 12 and five-sided vacuum panel 22 with a lance inserted in the area between case 12 and five-sided vacuum panel 22. The lance is inserted from the bottom of case 12. In other embodiments, the lance is inserted through self sealing holes in liner 14 and/or five-sided vacuum panel 22. While spraying the foam, the lance is slowly removed from the area between case 12 and five-sided vacuum panel 22 permitting the foam to expand and fill the area between case 12 and five-sided vacuum panel 22. This foam spraying procedure is also used to inject between liner 14 and five-sided vacuum panel 22. During foam injection between liner 14 and five-sided vacuum panel 22, the foam also flows into the joint where liner 14 is attached to case 12 to provide for foam insulation in the attachment area.

In another embodiment, refrigeration appliance cabinet 10 is made by changing the order of the steps described above. Specifically, refrigeration appliance cabinet 10 is made by the steps of inserting 56 liner 14 into cavity 37 of five-sided vacuum panel 22, injecting 58 foam between liner 14 and five-sided vacuum panel 22, and curing 60 the foam to form foam layer 26 and to attach five-sided vacuum panel 22 to liner 14. The method also includes inserting 50 five-sided vacuum panel 22 into case 12, injecting 52 foam between five-sided vacuum panel 22 and case 12, and curing 54 the foam to form foam layer 24 and to attach five-sided vacuum panel 22 to case 12.

Method 48 and five-sided vacuum panel 22, described above, provide for reducing heat leak issues in refrigeration appliances, especially at the corners of the refrigeration appliances. Particularly, five-sided vacuum panel 22 extends into the corners of the refrigeration cabinet and prevents heat leaks at the corners of the refrigeration appliance. In addition, method 48 and five-sided vacuum panel 22 provide for simplified manufacturing of refrigeration appliances which reduces the time needed to make refrigeration appliances, and removes the need for known vacuum panel standoffs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of insulating a refrigeration appliance, the refrigeration appliance comprising a case, a liner, and a five-sided, box like vacuum panel, the liner formed to be inserted into the case forming a chamber between the liner and the case, the five sides of the vacuum panel defining a cavity, said method comprising:
    positioning the five-sided vacuum panel in the case;
    injecting foam between an outer surface of the five-sided vacuum panel and an inner surface of the case;
    curing the foam to attach the five-sided vacuum panel to the case;
    after curing the foam to attach the five-sided vacuum panel to the case, inserting the liner into the cavity of the five-sided vacuum panel;
    injecting foam between an inner surface of the five-sided vacuum panel and an outer surface of the liner; and
    curing the foam to attach the five-sided vacuum panel to the liner.

2. A method in accordance with claim 1, wherein the five-sided vacuum panel comprises:
    a barrier envelope;
    an insulative core material positioned inside the barrier envelope; and
    four side portions and a back portion defining the cavity, the four side portions and the back portion formed by the barrier envelope and the insulative core material.

3. A method in accordance with claim 2, wherein the barrier envelope comprises at least one of a metalized plastic and alternating layers of at least one plastic material layer and at least one metal layer.

4. A method in accordance with claim 3, wherein the plastic material layer comprises at least one of a polystyrene composition, a polypropylene composition, and a polyethylene terephthalate composition.

5. A method in accordance with claim 3, wherein the insulative core material comprises at least one of fiberglass, an open-cell foam, and an insulative powder.

6. A method in accordance with claim 1, farther comprising evacuating air from the five-sided vacuum panel to reduce the pressure within the five-sided vacuum panel to below atmospheric pressure.

7. A method in accordance with claim 6, wherein evacuating air comprises evacuating air from the five-sided vacuum panel to reduce the pressure within the five-sided vacuum panel up to about 100 millibars.

8. A method in accordance with claim 6, wherein evacuating air comprises evacuating air from the five-sided vacuum panel to reduce the pressure within the five-sided vacuum panel up to about 10 millibars.

9. A method of insulating a refrigeration appliance, the refrigeration appliance comprising a case, a liner, and a five-sided, box like vacuum panel, the liner formed to be inserted into the case forming a chamber between the liner and the case, the five sides of the vacuum panel defining a cavity, said method comprising:
    positioning the five-sided vacuum panel over the outer surface of the liner;
    injecting foam between an inner surface of the five-sided vacuum panel and an outer surface of the liner;
    curing the foam to attach the five-sided vacuum panel to the liner;
    after curing the foam to attach the five-sided vacuum panel to the liner, positioning the case over the five-sided vacuum panel;
    injecting foam between an outer surface of the five-sided vacuum panel and an inner surface of the case; and
    curing the foam to attach the five-sided vacuum panel to the case.

* * * * *